Feb. 6, 1968    R. GRAY    3,367,281
APPARATUS FOR PUMPING WATER FROM WELLS USING WIND POWER
Filed March 23, 1966
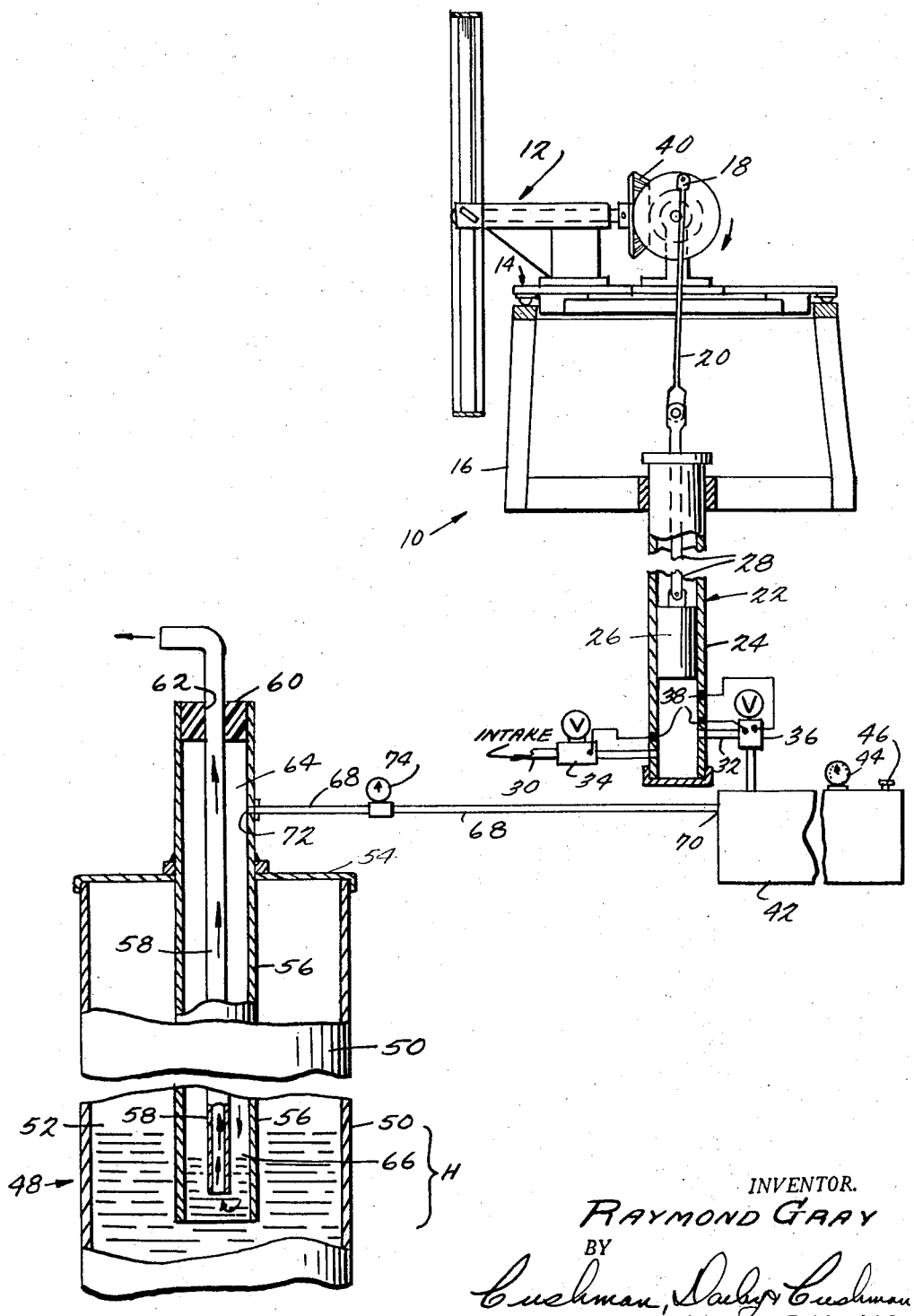
INVENTOR.
RAYMOND GRAY
BY
Cushman, Darby & Cushman
ATTORNEYS

United States Patent Office 3,367,281
Patented Feb. 6, 1968

3,367,281
APPARATUS FOR PUMPING WATER FROM
WELLS USING WIND POWER
Raymond Gray, P.O. Box 82, Cherokee, Tex. 76832
Filed Mar. 23, 1966, Ser. No. 536,720
5 Claims. (Cl. 103—234)

ABSTRACT OF THE DISCLOSURE

Apparatus for pumping water from a well having a bore partly filled with water, so as to have a water level intermediate the extent of the bore, said apparatus comprising: a first, larger diameter pipe received in the well and having an open lower end thereof substantially below said water level; a second, smaller diameter pipe received in the well within said first pipe; the external diameter of the second pipe being smaller than the internal diameter of the first pipe, thereby defining an annulus between the first and second pipes; said second pipe having an open lower end thereof below said water level and above the lower end of said first pipe; said second pipe extending up out of the well beyond the upper end of the first pipe; means sealing said annulus at the upper end of said first pipe; means at the upper end of the well bore supporting the first and second pipes in the well; a pressure vessel communicated to a supply of pressurized air; a pipe communicating the pressure vessel and the annulus near the upper end of the first pipe; a pressure regulator interposed in said pipe for supplying constant pressure air to said annulus for forcing the water in said annulus down, and the water in said second pipe up and out of the well.

A system for using a windmill to power a compressor connected to the pressure vessel is described.

---

The present invention relates to pumping apparatus and more particularly to means for pumping water from wells using wind power.

In the Southwest United States as well as in other relatively dry farming areas where water for livestock and general farming use has been a continuing, troublesome problem, windmills have come into extensive use as means to raise water from wells. Conventionally, in such instances, the water is pumped by means of a pipe and cylinder submerged in the well, the cylinder being equipped with a weighted check valve that opens inward into the cylinder and also with a lift valve attached to a long rod operatively connected to the windmill so that as the windmill turns, the rod reciprocates, moving the lift valve up and down. On the upward stroke, water is sucked through the check valve port into the cylinder. At the completion of the upward stroke, the check valve falls under the influence of its weight thus closing the port, then during the downward stroke of the rod, water is forced through the lift valve, which is usually of the ball-check variety. Successive upward and downward strokes of the rod lift more and more water above the lift valve and result in filling of the pipe which extends between the lift valve and the surface, until the pipe overflows at its upper end into a reservoir, trough or the like. From time to time, the pump parts just discussed, many of which are expensive, need repair and replacement. Since they are located way down in the well, this is often a difficult and time-consuming task. In addition, because much weight, including that of the rod, must be moved in order to pump water with such apparatus, the efficiency of pumping is relatively low compared with the amount of water which could theoretically be pumped using the available wind power. Some attempts have been made to improve upon such systems, for instance, by reducing the number and weight of pump parts which have to be moved, but by and large, such systems are not effectively usable with the narrow bore wells which prevail in the areas under discussion and require constant attention to manual manipulation of valves in order to function according to design.

It is a primary object of the present invention to overcome the difficulties just outlined by providing windmill-powered pumping apparatus which makes more efficient use of the wind power, which is usable in both large bore and small bore wells, that can be fabricated with widely available components, which is susceptible to easy repair since no moving parts need be located within the well and which does not need constant attention to element manipulation in order to perform satisfactorily.

Another object of the invention is the provision of means for pumping water from wells which includes a windmill operatively connected to an air compressor in turn communicated via hold-up and pressure regulating means to the annulus between two concentric pipes both having their lower ends below the natural water level in the well and the lower end of the outer pipe being below the lower end of the inner pipe whereby compressed air acting downwardly on the water in the annulus causes the upflow of water to the surface and out of the well at a constant rate.

These and other objects of the invention, as well as the principles and scope of applicability of the invention will become more clearly apparent during the course of the following detailed discussion which is keyed to the embodiment illustrated in the attached drawing.

In the drawing:

The figure is a schematic elevation view, with parts broken away to expose otherwise hidden elements, of pumping apparatus according to the present invention.

The pumping apparatus 10 includes a windmill, generally illustrated at 12, of a type widely available from several manufacturers and having conventional means 14 to face it into the prevailing wind, a ground engaging support 16 and pitman means 18 for reciprocating a relatively short rod 20 which replaces the long rod extending into the well as discussed hereinabove. The rod 20 operatively connects with an air compressor 22, which may be as simple as those used to manually pump up bicycle tires or as complicated as the situation warrants. In the embodiment illustrated, the compressor 22 includes a cylinder or housing 24 in which a piston 26 is reciprocable, being secured, via a piston rod 28, to the rod 20. The cylinder 24 has an air inlet 30 and an air outlet 32 each having solenoid operated valves 34 and 36 therein and suitable conventional sensors 38, responsive to movement of the piston so that air is drawn into the cylinder through the inlet 30 on the upstroke, and compressed air expelled through the outlet 32 during the latter part of the downstroke, each valve being closed while the other is open, to prevent reversal of flow. A turbine type compressor could be substituted for the reciprocating compressor 22, within the purview of the invention, by interposing between the rod 20 and the compressor, any conventional means for changing reciprocating motion to rotary motion or by driving the compressor directly by the rotary motion provided by the gearing 40 or the like.

The compressed air outlet 32 is shown communicated to a hold-up tank 42 provided with a pressure gauge 44 and a safety valve 46.

The well, generally illustrated at 48, can be of either the wide variety, such as a dug well, or a narrow variety, of, for instance, 6–8 inch diameter, such as a driven or bored well. The well 48 is shown including a casing 50 and having a natural water level at 52. A bracket 54 is mounted on the upper end of the casing 52 in order to support concentric pipes 56 and 58, which extend down into the well below the natural water level, for instance, about 50 to 60 feet in the case of the outer pipe, and upwardly out of the well. It is not necessary to the functioning of the apparatus of the invention that the bracket 54 close off the upper end of the well. The outer pipe 56 is seen in the figure to extend somewhat below the inner pipe 58, for instance, 20 to 30 feet. A plug 60 of sealing material is mounted in the upper end of the outer pipe 56. The inner pipe 58 sealingly extends up to through the central opening 62 in the plug 60 and leads to a reservoir, trough or other location for using or storing the pumped water.

Compressed air is communicated to the closed annulus 64 defined between the inner and outer pipes 58, 56, the bottom of the plug 60 and the upper surface of the well water at 66, by way of a conduit 68 connected to the air tank 42 at 70 and through the wall of the pipe 56 to the annulus 64 at 72. A conventional pressure regulator 74 interposed in the line 68 is set to provide a constant pressure to the annulus 64 so long as the pressure in the tank 42 exceeds that pressure.

In operation, wind turning the windmill results in the compressor producing compressed air which is accumulated in the air tank and supplied at constant pressure to the annulus between the concentric piping in the well. The air pressure pushing down at 66 causes water to flow up the inner pipe, the water within the pipe 56 being continuously replaced from below by virtue of the head H, so long as the pumping rate does not exceed the rate of water seepage into the well and deplete the head. As will occur to those skilled in the art, the pumping rate can be prevented from exceeding the seepage rate by adjustment of the pressure regulator as well as, initially, by choice of absolute and relative diameters for the pipes 56 and 58. It should be apparent that the apparatus 10 once set in operation needs no constant attention, but only periodic inspection for replacement of parts and repair when necessary.

It should also be apparent that the apparatus just described clearly accomplishes the object of the invention as set forth hereinbefore and illustrates the principles of the present invention. Because the particular embodiment shown can be considerably modified without departing from these principles or failing to accomplish these objects, the present invention should be understood as encompassing all such modifications as are within the spirit and scope of the following claims.

I claim:
1. Apparatus for pumping water from a well comprising: a windmill adapted to be driven by the wind; an air compressor; means operatively connecting said air compressor to said windmill whereby air is compressed by said air compressor as said windmill is driven by the wind; compressed air hold-up means connected to said air compressor to receive compressed air therefrom; a first pipe constructed and arranged to extend from above a well downwardly into the well and terminate below the natural water level therein; a second pipe constructed and arranged to extend from above the well downwardly within the bore of the first pipe and terminate below the natural water level in the well and above the terminus of the first pipe; said first pipe and said second pipe terminating in open lower ends in communication with the well; an annulus being defined between the exterior of the second pipe and the interior of the first pipe; means sealingly closing the annulus near the upper ends of the first and second pipes; conduit means communicating said compressed air hold-up means to said annulus below said sealingly closing means; a pressure regulator interposed in said conduit means and constructed and arranged to provide air at constant pressure to said annulus whereby compressed air acting downwardly on the well water within said annulus, forces water up the bore of said second pipe and out of the well.

2. The apparatus of claim 1 wherein the compressed air hold-up means comprises a tank provided with a safety valve.

3. The apparatus of claim 1 wherein the first and second pipes are constructed and arranged to be supported on the well by a bracket which grips at least the first pipe and is adapted to rest on the upper end of the well.

4. The apparatus of claim 1 wherein the windmill includes a pitman having a reciprocable rod operatively secured thereto and wherein the compressor includes a cylinder having an air compressing reciprocable piston therein, said piston being secured to said rod for reciprocation therewith.

5. Apparatus for pumping water from a well having a bore partly filled with water, so as to have a water level intermediate the extent of the bore, said apparatus comprising: a first, larger diameter pipe received in the well and having an open lower end thereof substantially below said water level; a second, smaller diameter pipe received in the well within said first pipe; the external diameter of the second pipe being smaller than the external diameter of the first pipe, thereby defining an annulus between the first and second pipes; said second pipe having an open lower end thereof below said water level and above the lower end of said first pipe; said second pipe extending up out of the well beyond the upper end of the first pipe; means sealing said annulus at the upper end of said first pipe; means at the upper end of the well bore supporting the first and second pipes in the well; a pressure vessel communicated to a supply of pressurized air; a pipe communicating the pressure vessel and the annulus near the upper end of the first pipe; a pressure regulator interposed in said pipe for supplying constant pressure air to said annulus for forcing the water in said annulus down, and the water in said second pipe up and out of the well.

References Cited

UNITED STATES PATENTS 350,761 12/1886 Neff _____ 104—234
570,844 11/1896 Danato.
1,147,646 7/1915 Robbins _____ 230—60 X ROBERT M. WALKER, *Primary Examiner.*